US009667715B2

(12) United States Patent
Kerber

(10) Patent No.: US 9,667,715 B2
(45) Date of Patent: May 30, 2017

(54) METHOD FOR CONTROLLING CHANGES IN A COMPUTER SYSTEM

(71) Applicant: Hannes Kerber, Johannesburg (ZA)

(72) Inventor: Hannes Kerber, Johannesburg (ZA)

(73) Assignee: SAP SE, Walldorf (DE)

( * ) Notice: Subject to any disclaimer, the term of this patent is extended or adjusted under 35 U.S.C. 154(b) by 202 days.

(21) Appl. No.: 14/535,352

(22) Filed: Nov. 7, 2014

(65) Prior Publication Data
US 2016/0134476 A1 May 12, 2016

(51) Int. Cl.
*H04L 29/08* (2006.01)
*H04L 12/24* (2006.01)
(52) U.S. Cl.
CPC .......... *H04L 67/104* (2013.01); *H04L 41/082* (2013.01); *H04L 67/125* (2013.01); *H04L 41/5038* (2013.01)
(58) Field of Classification Search
None
See application file for complete search history.

(56) References Cited

U.S. PATENT DOCUMENTS

| 9,189,533 | B2* | 11/2015 | Wautier | G06F 17/30575 |
| 2007/0073785 | A1 | 3/2007 | Laird | |
| 2007/0100903 | A1 | 5/2007 | Cherry | |
| 2009/0150373 | A1* | 6/2009 | Davis | G11B 27/105 |
| 2009/0271346 | A1 | 10/2009 | Weber et al. | |
| 2011/0082900 | A1* | 4/2011 | Nagpal | H04W 8/245 |
| | | | | 709/203 |
| 2012/0079095 | A1* | 3/2012 | Evans | G06F 8/61 |
| | | | | 709/224 |
| 2012/0079502 | A1 | 3/2012 | Kwan et al. | |
| 2012/0297363 | A1* | 11/2012 | Perisic | G06F 8/71 |
| | | | | 717/122 |
| 2014/0245290 | A1* | 8/2014 | Gupta | G06F 8/61 |
| | | | | 717/178 |
| 2014/0258970 | A1* | 9/2014 | Brown | G06F 8/47 |
| | | | | 717/103 |

OTHER PUBLICATIONS

EPO, European Search Report, EP 14192309.4, May 6, 2015.

* cited by examiner

*Primary Examiner* — Thomas Dailey
(74) *Attorney, Agent, or Firm* — Richardt Patentanwalte PartG m

(57) ABSTRACT

A system and method are provided for controlling changes in at least a first and a second computer system. First changes to a first application, having a first configuration, are made by a development server of the first computer system and result in a second application, having a second configuration. A central management module receives data indicative of the first changes, determines components of the second computer system that are affected by the change, determines update tasks to be executed on the second computer for implementing the first changes in the second computer system, and sends the update tasks to the second computer system. Second changes to the first application, made by the second computer system, may be synchronized with the first changes and moved the first computer system for testing. The first and second changes may be performed independently and in parallel.

7 Claims, 5 Drawing Sheets

| KPI | definition | trend | KPI |
|---|---|---|---|
| Change1 | Def1 | △ | 90% |
| Change2 | Def2 | △ | 95% |
| Change3 | Def3 | ▷ | 80% |

500

METHOD FOR CONTROLLING CHANGES IN A COMPUTER SYSTEM

BACKGROUND OF THE DISCLOSURE

Field of the Disclosure

The invention relates to computing systems, and more particularly to a method for controlling changes in a computer system.

Description of the Related Art

In modern computer systems, in which several releases are processed at the same time, changes can be made in different development systems: new developments can be made for example in a development or release system of a first computer system landscape, and errors corrected or improvements made in a maintenance or production system of a second computer system landscape for production purpose, at the same time. However, since changes are made in parallel, the changes cannot be transported between both systems in requests, because current software can be overwritten and inconsistencies can occur.

SUMMARY OF THE PRESENT DISCLOSURE

Various embodiments provide a method for controlling changes in a first and second computer system, a central management module and a computer program product as described by the subject matter of the independent claims. Advantageous embodiments are described in the dependent claims.

In one aspect, the invention relates to a computer implemented method for controlling changes in at least a first and a second computer system, the first computer system comprising a first development server that is connected to a production server, wherein the production server comprises a first application having a first configuration, wherein the first configuration comprises at least one of a software and hardware configuration, wherein the first development server is configured to perform at least one of providing and modifying the first application at the first development server by generating a modified configuration from the first configuration, the second computer system comprising a second development server for upgrading the first application (e.g. using the modified first application), the method comprising:

providing a central management module that is in communication with the first computer system and the second computer system;

providing an input data interface;

configuring the first computer system to communicate with the central management module via the input data interface;

receiving at the central management module from the first computer system via the input data interface data indicative of a change in the first configuration, the change resulting in a second application having a second configuration, wherein the second configuration comprises at least one of a software and hardware configuration;

processing by the central management module the received data for determining at least one component of the second computer system that are affected by the change;

determining by the central management module using the determined components at least one update task for implementing the change in the second computer system;

providing an auto reaction interface and an execution interface;

assigning, to each of the at least one update task, a respective ranking using a predefined ranking criterion;

sending, using the auto reaction interface, the at least one update task via the execution interface to the second computer system;

controlling the second computer system via at least the execution interface to execute the at least one update task in an order defined by the ranking, thereby implementing the second application in the second computer system using the second configuration.

In another aspect, the invention relates to a central management module for controlling changes in at least a first and a second computer system, the first computer system comprising a first development server that is connected to a production server, wherein the production server comprises a first application having a first configuration, wherein the first configuration comprises at least one of a software and hardware configuration, wherein the first development server is configured to perform at least one of providing, and modifying the first application at the first development server by generating a modified configuration from the first configuration, the second computer system comprising a second development server for upgrading the first application (e.g. using the modified first application). The central management module comprises an input data interface, wherein the first computer system is configured to communicate with the central management module via the input data interface;

an auto reaction interface and an execution interface; wherein the central management module is configured for:

receiving via the input data interface data indicative of a change in the first configuration from the first computer system, the change resulting in a second application having a second configuration, wherein the second configuration comprises at least one of a second software and a second hardware configuration;

processing the received data for determining at least one component of the second computer system that are affected by the change;

based on the determined components determining at least one update task for implementing the change in the second computer system;

assigning, to each of the at least one update task, a respective ranking using a predefined ranking criterion;

sending, using the auto reaction interface, the at least one update task via the execution interface to the second computer system;

controlling the second computer system via at least the execution interface to execute the at least one update task in an order defined by the ranking, thereby implementing the second application in the second computer system using the second configuration.

BRIEF DESCRIPTION OF THE DRAWINGS

The accompanying drawings illustrate the various embodiments and, together with the description, further serve to explain the principles of the embodiments and to enable one skilled in the pertinent art to make and use the embodiments.

DETAILED DESCRIPTION

Figure 1:
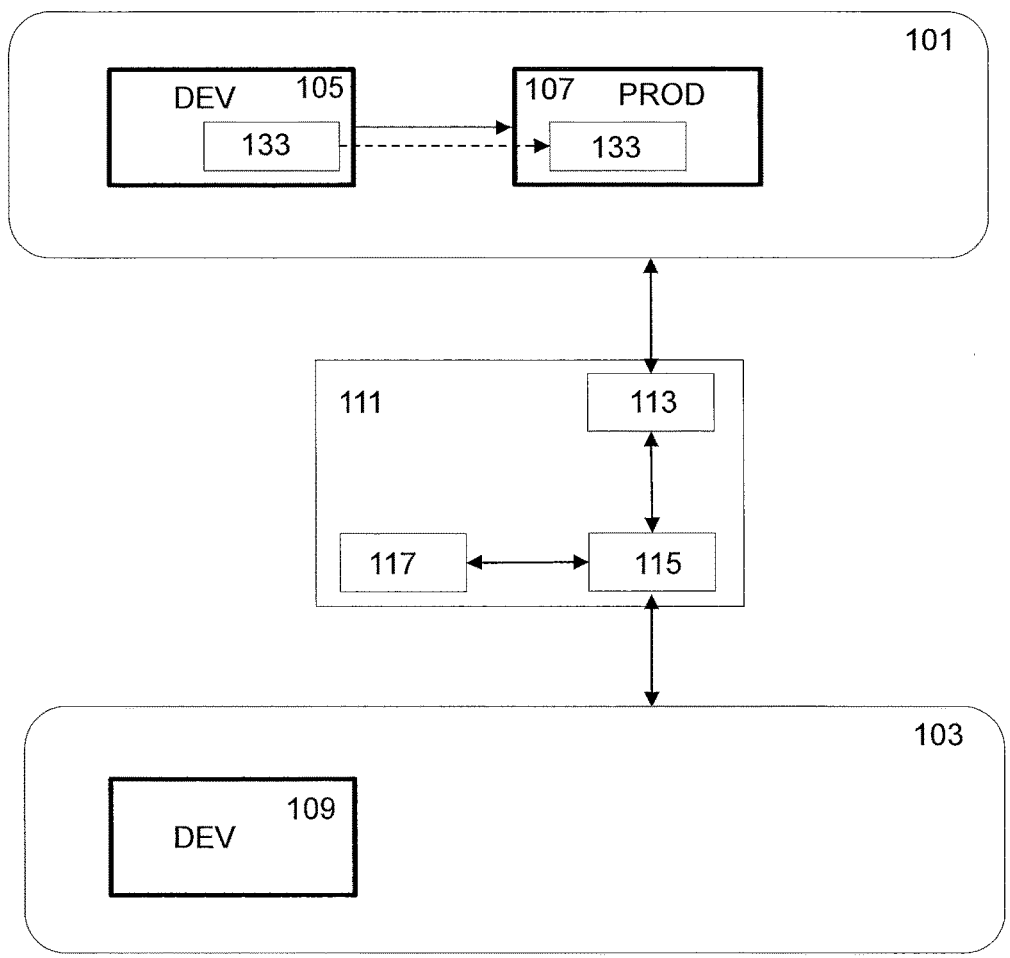
FIG. 1 is a schematic diagram illustrating an exemplary computer system.

In the following, like numbered elements in the figures either designate similar elements or designate elements that perform an equivalent function. Elements which have been discussed previously will not necessarily be discussed in later figures if the function is equivalent.

"An application having a given configuration" means that the application requires that configuration in order to be executed or run on a computer device on which it is installed or implemented.

The upgrading may comprise changing or updating the first or the second configuration (e.g. for providing a new release of the first application) of the first or second application respectively for obtaining an upgraded application that has a third configuration. The upgrade may be performed on the second application if the change has been detected and thus implemented in the second computer system otherwise the upgrade may be performed on the first application. The change introduced by the upgrading may concern hardware required for running the first or second application, software (e.g. the first or second application itself or other program from which the first or second application depends) and/or data used by the first or second application.

The upgrading may be performed and finalized (e.g. and a new release of the first application is provided) at a predefined upgrade frequency. The predefined upgrade frequency may, for example, be one upgrade per year etc. The second computer system may be configured to automatically send the upgraded application to the production server for production at the upgrade frequency e.g. as soon as the upgraded application is available it may be sent and implemented in the production server.

The second computer system may be configured to forward or to send the upgraded application to the production server (for performing production using the upgraded application) as soon as the changes at the first computer system are implemented or taken into account by the second computer system for providing the upgraded application.

An interface of the data input interface and the execution interface may comprise a hardware or a software interface.

Determining the at least one component may comprise evaluating the received data indicative of the change e.g. identifying which software component or which data used by the first application has been changed. In this case, the at least one component may comprise the identified software component and the data.

For example, before the method starts (e.g. before the receiving step) the first development server, the second development server and the production server may comprise the first application and have the first configuration of the first application required to run the first application.

The production server may be configured to execute or run an application e.g. the first application after being received from the first development server or the second development server. The execution of the application may produce output data e.g. as predetermined or expected by a user of the first or second computer system. The output data may comprise for example computer files or tables etc.

In another example, example, the execution of the application may control the operation of a machine (e.g. for producing image signals) that is connected and controlled by the production server.

For example, the first development server may be configured to automatically move or send the first application or a modified first application to the production server as soon as a modification to the first application is performed (e.g. and successfully tested) or the first or modified first application is available. In another example, the first development server may be configured to send the first or modified applications on a periodic basis.

The above features may have the advantage of providing an efficient synchronization process or method for maintaining the second computer system up-to-date with the changes that may happen at the first computer system. This may ensure the integrity of the production server as it may prevent the usage of an upgraded application that does not take into account the changes at the first computer system which may cause inconsistencies at the production server.

The present method may ensure that changes at the first computer system are propagated in time such that the upgrade of the first application may take the changes into account before delivering the upgraded application to the production server. This is in contrast to a random implementation of the changes coming from the first computer system and the second computer system in the production server.

The usage of multiple interfaces may provide an efficient separation of functionalities between the interfaces that may speed up the process of synchronization so as to implement the changes at the second computer system as soon as they are detected at the first computer system. This may also provide a modular design of the synchronization process.

According to one embodiment, the method further comprises controlling the first computer system to automatically send the data indicative of the change to the central management module. This may further speed up the synchronization process.

In another example, the method further comprises controlling the first computer system to send the change to the central management module on a periodic basis e.g. every week or every day etc. For example, the first computer system may check at the end of every day if a change in the first application has occurred this day and thus may send data indicative of that change to the central management module if the change has occurred.

In a further example, the first computer system may check at a given submission frequency whether a change to the first application is implemented or occurred and thus send data indicative of that change to the central management module, wherein the submission frequency is smaller than the upgrade frequency. This is to avoid that an upgraded application is built without receiving and thus taking into account a change in the first application.

According to one embodiment, the method further comprises determining at least part of the at least one update task to be automatically executed; and automatically controlling the second computer system to execute at least part of the at least one update task. This may further speed up the synchronization process.

According to one embodiment, the method further comprises controlling by the central management module the first computer system for performing a test of the second application at the first development server; in case the test at the first development server is a successful test performing a cutover for moving the second application to a production phase at the production server and sending the data indicative of the change by the first development server or the production server to the central management module.

The production phase is a phase during which the second application is used for production at the production server instead of the first application.

The cutover refers to the transmission or copy or movement of the second application (or data indicative of the second application that may include the software, data, hardware settings etc.) to the production server. The cutover may also include activities such as setting up and initializing of the production server, closing legacy systems or applications e.g. the first application and its dependencies, and entering of data at the production server.

This embodiment may further speed up the synchronization process as it may avoid iterations between the first and second computer systems that may be caused by a non-tested change which may not work or implemented on the second computer system. This embodiment may have another advantage of providing accurate and reliable applications that may be used for production.

The controlling of the first computer system may be performed for example via the data input interface. For example, the central management module may send control signals or instructions to the first computer system to perform the test, cutover and the submission of the data indicative of the change.

For example, the production server may send the data indicative of the change to the central management module as soon as the production at the production server starts using or taking into account the change e.g. using the second application at the production server instead of the first application. This may ensure that only changes that are effectively running or taken into account at the production server are forwarded to the second computer system. This may avoid the case where the cutover did not work for any reason e.g. for example because the connection is broken between the first development server and the production server and thus the second application cannot be moved to the production server while the first development server already sent the data indicative of the change to the central management module.

In another example, the first development server may send the data indicative of the change to the central management module. This may have the advantage of speeding up the synchronization process as it may save time that would otherwise be required to move the second application to the production server for a subsequent submission of the data indicative of the change by the production server to the central management module.

According to one embodiment, the method further comprises in case the test is an unsuccessful test controlling the first computer system for providing another change; testing the other change using the first development server; and repeating the controlling and the testing steps until the test is successful. This may prevent (external) iterations between the first and second computer systems that may last more than an internal iteration within the first computer system between the first development server and another component (which may be the first development server itself) that provides the changes. This may further speed up the synchronization process.

According to one embodiment, a successful test of the second application is a test that produces predetermined results of the second application or produce results of the second application in a predetermined manner. The predetermined results may comprise a "correct" response (i.e., an expected response) of the second application.

According to one embodiment, the auto reaction interface comprises a first interface component for providing an interface between the central management module and a user of the central management module, wherein in case an update task of the at least one update task relates to a component of the second computer system that requires an external input the sending of the at least one update task further comprises notifying by the central management module the user via the first interface component about the update task, wherein controlling the second computer system further comprises receiving at the second computer system via the execution interface a command from the user for executing the update task.

This embodiment further improves the modularity aspect of the present method.

For example, the first interface component may be a graphical user interface. The auto reaction interface may further comprise a second interface component for interaction between the auto reaction interface and the execution interface.

For example, the external input may comprise the command.

According to one embodiment, the predefined ranking criterion comprises a software, data and/or hardware component type, wherein the ranking comprises assigning ranking values to the at least one update task and sorting the ranking values in a descending order following the order of hardware, software and data components. This may provide an efficient method for implementing the changes e.g. starting by the most complicated or time consuming one such as for the hardware component.

The ranking criterion may also comprise a number of dependencies between the determined at least one component. For example, a component of the at least one component that may be changed (or configured according to the change) independent (i.e. number of dependencies is zero) of the other components of the determined components may be ranked first. If, for example, a first component of the determined components depends on two other components (e.g. of the determined components) and a second component of the determined components depends only on one component (e.g. of the determined components) the second component may have higher ranking value than the first component and may thus first implemented before the first component. This may for example allow a progressive test of the changes that have been implemented e.g. as soon as the update task related to the first ranked component is executed a first test may be performed to check the implemented change.

According to one embodiment, the method further comprises providing a reporting interface; determining by the central management module for the at least one update task at least one key performance indicator, KPI; rendering by the central management module the at least one KPI using the reporting interface.

The rendering of the KPI may trigger feedbacks on the changes that have been implemented. Such feedbacks may be taken into account to improve the changes etc.

According to one embodiment, the KPI comprises a fraction of the at least one updated task that have been automatically executed; a time required to implement the change in the second computer system; a status indicative of a completion or a non-completion of the implementation of the second application.

According to one embodiment, the method further comprises recording by the central management module the received data in a database of the central management module in association with a time stamp. This may keep tracks of the different changes as they may be versioned using the timestamps.

According to one embodiment, the first and second computer systems produce changes to the first application in parallel. For example, the first development server and the second development servers may be configured to perform changes in parallel (concurrently) to the first application being currently running or used for production at the production server. New developments e.g. new releases may be made in the second development server and errors corrected or improvements made in the first development server.

For example, the first and the second development server may perform the changes to the first application at a first time dependent frequency and a second time dependent frequency respectively. The method further comprises, before performing the method steps determining that the first time dependent frequency is higher than the second time dependent frequency.

The comparison between the first time dependent frequency and the second time dependent frequency may be performed periodically or on a periodic basis.

In another example, in a given point in time, the method further comprises determining that the first time dependent frequency is lower than the second time dependent frequency. In this case, the method steps may be executed by changing the role between the first and second computer systems (what is executed by or for the first computer system would be executed for the second computer system and vice versa). In addition, the first development server may be configured, before sending any modified application to the production server that the modified application takes into consideration or implements the changes that have been detected and sent by the second computer system.

The data input interface may be a first interface. The execution interface may be a second interface. The auto reaction interface may be a third interface. The reporting interface may be a fourth interface.

According to one embodiment, the central management module is comprised in a mobile telecommunication device.

FIG. 1 is a block diagram showing a first computer system 101 and a second computer system 103. The first computer system 101 hereafter also referred to as a production system. The second computer system 103 hereafter also referred to as a release system. For example, the first computer system 101 may be an SAP ECC Production landscape, and the second computer system may be an SAP ECC Release landscape.

The production system 101 may comprise a first development server 105 that is connected to a production server 107. The connection between the development server 105 and the production server 107 may comprise for example a wireline (or wired) and/or a wireless connection. The wireline connection may comprise Ethernet and/or serial links. The wireless connection may comprise a WiFi, Peer-to-Peer (P2P), Bluetooth connection and the like.

The production server 107 is shown as part of the production system 101; however the production server 107 may be a separate component from both the production and release systems, wherein the production and release systems 101 and 103 are connected to the production server 107.

As used herein the term "server" refers to any computerized component, system or entity regardless of form that is adapted to provide data, files, applications, content, or other services to one or more other devices or entities.

The production server 107 may comprise a first application 133. For example, the first application 133 may comprise instructions that when executed by the production server 107 may perform a predefined function such as providing output data in accordance with a predefined function implemented by an algorithm or a program code. The first application 133 has a first configuration. The first configuration comprises at least one of a software and hardware configuration. In other terms, the first application 133 may require the first configuration in order to run on the production server 107.

For example, a hardware configuration of the first configuration may comprise a number of components and/or their settings of the first development server 105 and/or production server 107, some of which have optional settings which are preset when the first computer system 101 is provided to conform with a particular user's requirement and to run the first application 133. The hardware configuration may further comprise a firmware configuration. The firmware configuration may comprise a number of components such as memory units of the read only type preloaded with software to run various routines operations on the hardware configuration, in dependence on the hardware configuration of the first configuration.

For example, a software configuration of the first configuration may include an operating system for the hardware configuration of the first configuration and a number of application programs including the first application 133. The software configuration may further comprise a data configuration, wherein the data configuration may for example indicate the data to be accessed or used by the first application 133 when running on the production server 107.

The first application 133 may be developed or created and optionally tested at the first development server 105 before being sent to and thus used by the production server 107. After being used or running at the production server 107, changes to the first application 133 that may be introduced at the first development server 105 are allowed to flow to the production server 107 on a regular basis (e.g. every day which may be a maintenance frequency of the production system 101). In another example, as soon as the first application 133 is modified at the first development server 105 it is immediately (e.g. automatically) transmitted to the production server 107. The modification may comprise, for example, a change in the data that is used by the first application 133, a change in the code of the first application 133 itself, an additional option for the first application 133 that may require a new library or a new application program, a change in the setting of the hardware components used by the first application 133 in order to run, an additional hardware component that may be required by the modified application 133, updated program codes or a combination thereof.

Before being transmitted to the production server 107, the first application 133 may be tested at the first development server 105. For example, the first development server 105 may comprise a test module. Once a given modification of the first configuration (e.g. once the first application 133 is modified at the first development server 105) is available, it may be setup and tested at the test module to ensure that the modified application works as expected with the modified configuration. In another example, the test module may be separate as or comprised in a separate server from the first development server, and in this case the first development server may be connected to the production server via the test module and the test module may forward e.g. changed applications or data to the production server after successful testing. After satisfactory (e.g. having predetermined or expected results) results in the test module the modified application is recorded in the test module and then moved into the production server 107 for being used for production (e.g. of predefined data output results).

The release system 103 may comprise a second development server 109. The second development server 109 may upgrade the first application 133 e.g. for providing another release of the first application 133. Once a new release of the first application 133 is available it may be moved either to the production server 107 or to the first development server 105 such that it can be tested by the test module before being used for production at the production server 107. Before the new release of the first application 133 is moved to the production server 107, the second computer system 103 may be synchronized (see FIG. 3 for further details) with changes of the first application 133 from the first development server 105 that have been migrated to the production server 107.

The release system 103 and the production system 101 may be independent from each other. The release system 103 may be concerned with long term implementation projects (e.g. upgrades). For example, the upgrade of the first application 133 may occur at an upgrade frequency that is smaller than a modification frequency of the first application 133 at the first development server 105.

FIG. 1 further shows a central management module 111 in accordance with the present disclosure. The central management module 111 may be in communication with the first computer system 101 and the second computer system 103.

The central management module 111 may be connected to the first computer system 101 e.g. via a network which may be a public network, such as the Internet, a private network, such as a wide area network (WAN), a wired connection such as Ethernet or a combination thereof.

The central management module 111 may be connected to the second computer system 103 e.g. via a network which may be a public network, such as the Internet, a private network, such as a wide area network (WAN), a wired connection such as Ethernet or a combination thereof.

The central management module 111 may comprise a computer or computer system or computer device e.g. as described with reference to FIG. 6 or a mobile telecommunication device.

The central management module 111 may comprise an input data interface 113. The first computer system 101 may be configured to communicate with the central management module 111 via the input data interface 113.

The input data interface 113 may comprise a software or a hardware interface. The software interface may comprise for example an application programming interface (API). For example, the hardware interface refers to a set of one or more hardware signal lines and/or connectors coupled at least between the central management module 111 and the first computer system 101, through which the two communicate with one another. For example, communication via the data input interface 113 may be according to one or more protocols.

By way of illustration and not limitation, the data input interface 113 may variously include any of a variety of one or more shared and/or dedicated buses, and/or other sets of signal lines for exchanging data between the central management module 111 and the first computer system 101. The central management module 111 may further comprise an execution interface 115 and an auto reaction interface 117.

The second computer system 103 may be configured to communicate with the central management module 111 via the execution interface 115.

Figure 2:
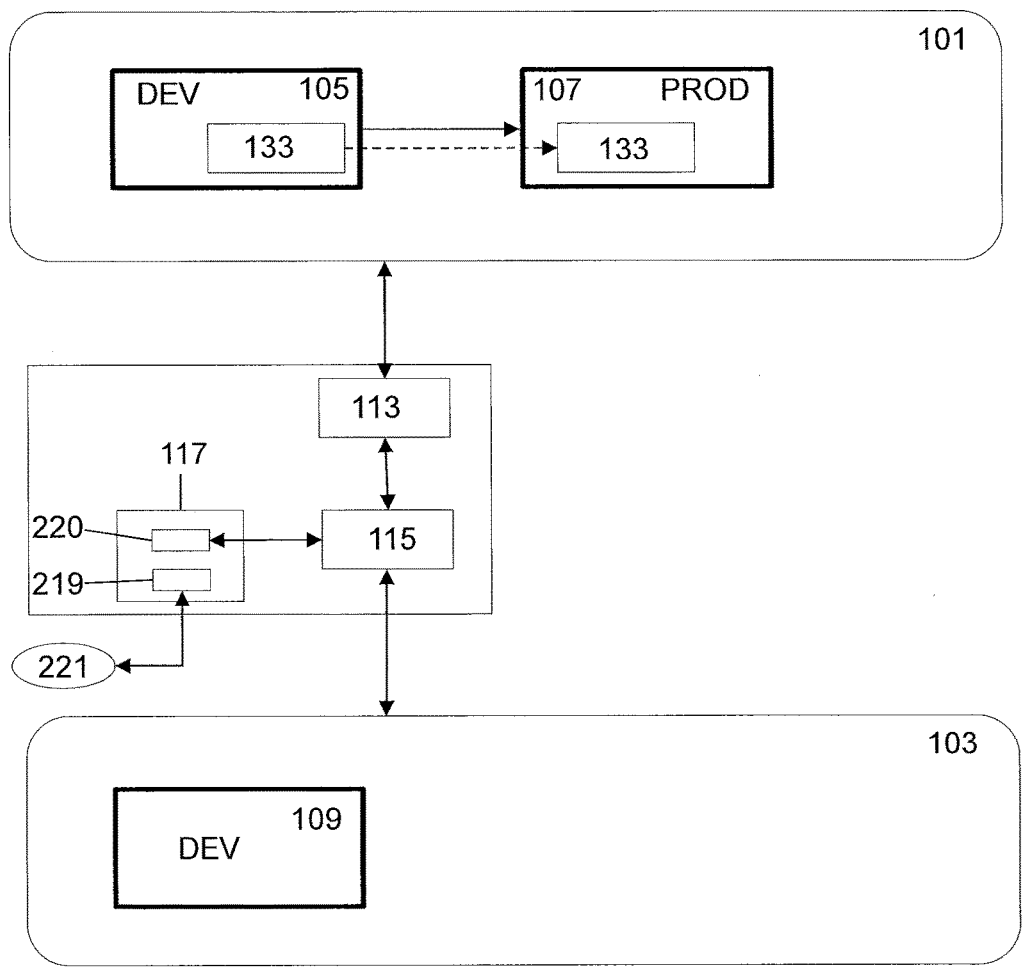
FIG. 2 is a schematic diagram illustrating another exemplary computer system.

The auto reaction interface 117 may be used by the central management module 111 to communicate with the execution interface 115 and a user of the central management module. For that, it is shown in another embodiment of FIG. 2 that the auto reaction interface 117 may comprise a first interface component 219 and a second interface component 220 for communication with the user 221 and the execution interface 115 respectively.

Figure 3:
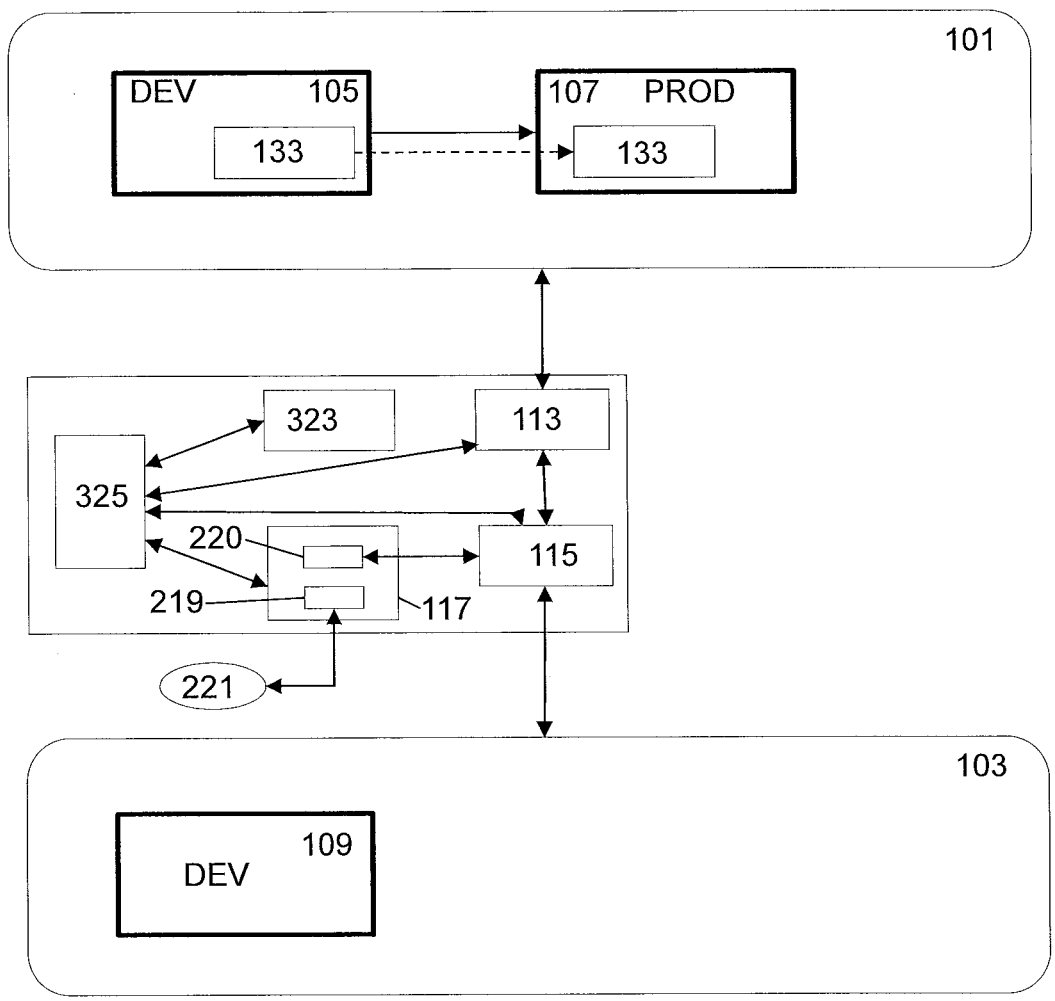
FIG. 3 is a schematic diagram illustrating a further exemplary computer system.

In another embodiment, the central management module 111 may further comprise a reporting interface 323 as shown with reference to FIG. 3 for reporting the results of the change migration between the first and second computer systems 101 and 103. For example, the reporting interface 323 may be the first interface component 219 of the auto reaction interface 117 but it may be separate from the auto reaction interface 117 as shown in FIG. 3. FIG. 3 further shows a central interface 325 that may be used by the central management module 111 for communication with any of interfaces 117, 115, 113 and 323.

The operation of the central management module 111 will be described in details with reference to FIGS. 4-6.

Figure 4:
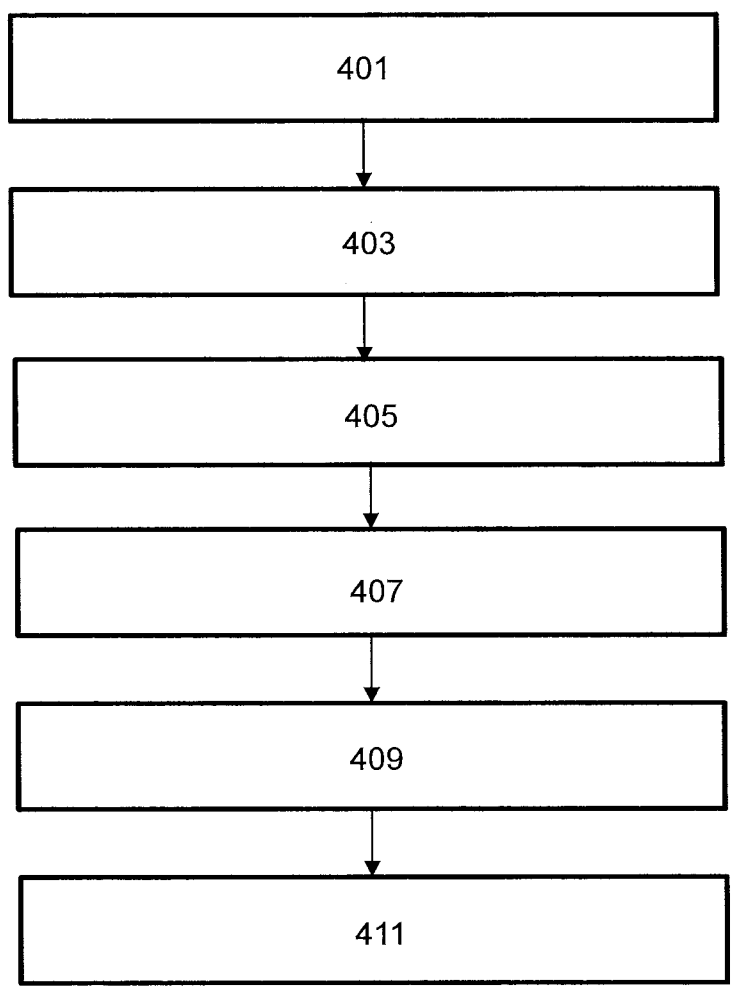
FIG. 4 is a flowchart of a method for controlling changes in at least the first and second computer systems.

FIG. 4 is a flowchart of a method for controlling changes in at least the first 101 and second 103 computer systems.

In block 401, the central management module 111 may receive via the input data interface 113 data indicative of a change in the first configuration of the first application 133, resulting in a second application, from the first computer system 101. The data may automatically be received as soon as the change is implemented in the first computer system 101. The data may be received from the first development server 105 or from the production server 107. The data may be received from the first development server 105 after the change in the first configuration is implemented and/or tested (and the test is a successful test) at the first development server 105. In another example, the data may be received from the first development server 105 or from the production server 107 after the second application is moved into the production server 107 (or the data may be received from a user). The second application (i.e. modified first application 133) may have a second configuration. The second configuration comprises at least one of software and hardware configuration. For example, the software, hardware or both software and hardware configurations of the first configuration may be changed in order to obtain the second application (changing the first configuration refers to changing the first application and vice versa).

The data may be received in a format as defined by the protocol of the input data interface 113. The data input data interface 113 may be provided as a high-speed interface in order to increase the data transmission speed via the data input interface 113. This may speed up the synchronization process between the two computer systems 101 and 103.

The received data may comprise an indication of the change and/or the components that have changed e.g. changed data, change program applications or changed hardware settings.

The change may occur in parallel to the upgrading of the first application 133 by the second computer system 103.

In block 403, the central management module 111 may process the received data for determining one or more components of the second computer system 103 that are affected by the change. For example, the received data may indicate that the first application 133 has changed and the second computer system 103 has to install the second application. In this case, the component that is affected by the change may be the first application 133 (e.g. the code of the first application 133 itself) that is installed or implemented in the second computer system 103. In another example, the received data may indicate that the second configuration may require new features of the operating system that were not used before the change by the first application 133. In this case, the component that is concerned with change may be the operating system of the second computer system 103 or of the second development server 109.

In block 405, based on the determined components, the central management module 111 may determine one or more update tasks for implementing the change in the second computer system 103.

The central management module 111 may automatically determine the one or more update tasks e.g. using predefined change analysis frameworks. In another example, the central management module 111 may generate scripts (to perform the one or more update tasks) based on user inputs via the first interface component 219 that are received upon requesting the user inputs by the central management module 111. The user inputs may comprise user actions to perform the one or more update tasks. A user action may comprise for example configuring an application program and/or identifying a system operating environment such as a given operating system.

The term "update task" refers to an action to be performed by the second computer system. The task may be created as a logic program or set of instructions for realizing an intended function. For example, an update task may comprise an XML file that indicates the set of instructions.

In block 407, the central management module 111 may control the auto reaction interface 117 to rank the one or more update tasks according to a predefined ranking criterion.

In another example, the central management module 111 may prompt the user 221 via the first component 219 of the auto reaction interface 117 to request a ranking of the one or more update tasks.

The ranking criterion may be chosen so as to implement the change in the second computer system 103 in a most efficient way and in a short time period. For example, the ranking criterion may comprise software, data and/or hardware component type. For example, the update task related to a hardware component of the second computer system 103 may have the highest priority i.e. ranked first, and the update task related to a software component of the second computer system 103 may have the second highest priority i.e. ranked second and the update task related to a data component of the second computer system 103 may have the lowest priority. This is motivated by, for example, the fact that before setting a hardware component of the second computer system 103 the installation of a software application may not be possible or may be wrongly installed. In this case, it is important to execute the update task that is related to the hardware component before the update task related to the software application.

The ranking may also be based on the level of difficulty or complexity (time required to execute an update task) for executing an update task. The update task that requires longest time is first ranked and so on. In another example, the one or more update tasks may run in parallel based on their dependencies e.g. if the execution of an update task of the one or more update tasks does not depend on the execution of another other update task of the one or more update tasks.

In block 409, the central management module 111 may control or use the auto reaction interface 117 to send the one or more update tasks via the execution interface 115 to the second computer system 103. For example, the auto reaction interface 117 may send the one or more update tasks to the execution interface 115 that in turn sends them to the second computer system 103 such that one or more update tasks are stored or implemented (or prepared for execution) at the second computer system 103.

In block 411, the central management module 111 may control the second computer system 103 via the execution interface 115 to execute the one or more update tasks in the order according to the rank. For example, the central management module 111 may trigger the execution of the one or more update tasks e.g. by sending a command via the execution interface 115. In another example, the central management module 111 may notify the user 221 via the first component 219 about at least part of the one or more update tasks, wherein controlling of the second computer system 103 further comprises receiving at the second computer system 103 via the execution interface 115 a command from the user 221 for executing the at least part of the one or more update tasks.

Although only one release system 103 is shown, the skilled person will understand that the present method would be used for more than one release system.

In the following further example details of functions performed by the different interfaces are described.

For example, the data input interface 113 may support to enter multiple types (multi dimensional) of changes to the central management module 111 for further processing.

For example, the following tasks may be supported or performed by the data input interface 113.
  May be used to enter a change or data indicative of the change
    Any type of change (or data indicative of the change) may be entered or received via the data input interface 113 based on further described classification of the change such as which change type (software and/or hardware related), source of the change etc.
    At the time a change is implemented (and tested) can be sent to the central management module 111
    Example of changes: transport request at that time data related to the change (to be synchronized) such as a documentation/a test case
  Classification of the change using attributes
    Relevant attributes related to the change may be passed to the data input interface 113 for performing a classification of the change, which classification can be configured. Those attributes cover technical and organizational attributes.
    Example of attributes: Owner of the change, further details like data objects related to the change etc.
  Preparation of the data indicating the change for further processing
    Example: Determination of further attributes, such as type of connections required for transmitting data etc.

For example, the following tasks may be supported or performed by the central interface 325.
The central interface 325 processes the data indicative of the change received via data input interface 113 as follows.
  Storage of the data indicative of the change
    All data indicating the change, classification and attributes are stored in a central database of the central management module 111
    This covers also status when processing is executed Dependency and conflict analysis (e.g. between different elements of the second configuration hardware and software configurations etc.) may be triggered individually by type of the change Create a target entity e.g. release system 103 (e.g. change for target landscape containing change documentation and workflow)

Example: data transports in the production system 101 are analyzed for sequence dependencies and conflicts with the release system Trigger of an auto reaction If applicable, based on predefined reaction conditions (the target user is adapted to using emails) the type of the change (or the components affected by the change), auto reaction methods can be triggered which may covers automatic execution and/or notification purposes Example of an auto reaction method may comprise: Trigger notification via email to the user 221, automatically replicate transport, create task for specific user to execute etc.

Prepare for reporting and execution

The stored data is prepared and may be accessed for execution and reporting (e.g. via dashboards of the reporting interface 323)

A central user interface can be accessed to trigger, monitor or report on activities/outstanding tasks For example, the following tasks may be supported or performed by the auto reaction interface 117.

The auto reaction interface 117 is responsible for triggering any automatic actions, activities or execution (replication, synchronization, notification)

Execute activities

Based on type of the change (or components affected by the change) synchronization activities may be processed automatically. This may happen immediately (automatically) or on a periodic basis e.g. within a next batch run Also includes automatic creation of a change entity for the release system Example: Automatic auto import of changes or data indicative of changes Notification of constraints Notification via email or generated system tasks of people or organizations (enter to inbox concept)

Sent message of constraints, reminders etc. (based on kind of count down principles)

Example: Sent task in SAP SolMan CRM to complete manual synchronization tasks

Notification of completion

If a task is completed relevant organizations and/or people are automatically informed Example: Automatic email when auto synchronization was successful or errors occurred The execution interface provides a central access and UI to access all data Open activities Access open activities/tasks and access UIs for execution of those Drill down by type/application/organization Access individual UI by type/application Trigger execution or notifications, view logs etc.

Example: UI for change transport synchronization

Completed activities

Find all completed tasks/activities—includes drill down as described above

Example: transport requests, replicated documentation, target requests and changes Administration/Reporting Control and report status to central and reporting interface to enter there and make it available (access preparation, provisioning and validation)

Example: Logs, user, date, time, change, transport and other attributes are reported The reporting interface provides a central access to all KPIs and governance related reporting features Status and Backlogs Open and completed tasks Drill down by category and organization, all classification attributes can be used KPIs KPIs and reports can be defined individually or predefined ones can be used Are reflected as dashboards Reports can be pulled easily, all filter criteria can be used Dashboards Should fulfill overview tasks Provide drill down and access via central interface to all relevant applications and reports Access Access is provided via various interfaces: Dashboards, Reports, Mobiles, Trend etc.

Figures 5, 6:
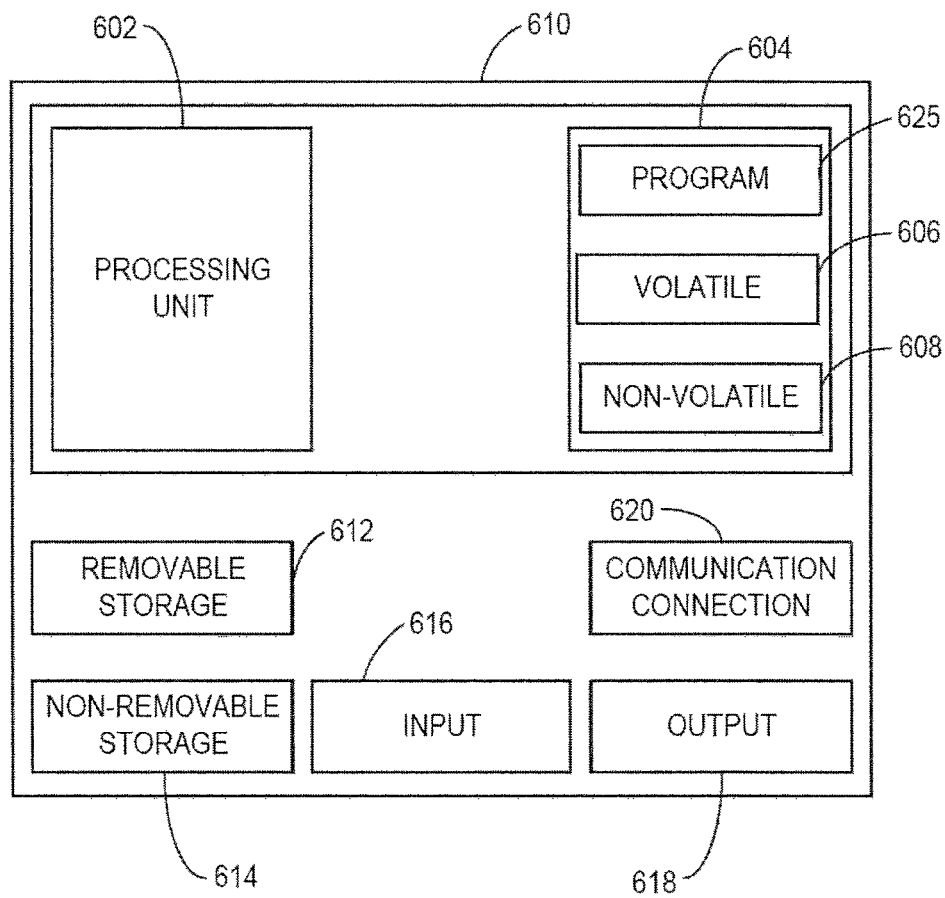
FIG. 5 illustrates an exemplary output of the present method that is displayed on a reporting interface.
FIG. 6 is a block diagram of a computing device, according to an example embodiment.

FIG. 5 shows an example of a content displayed on the reporting interface 323. The reporting interface 323 may display a table 500 listing different categories of changes (i.e. change1 of a first category, change2, change 3 and change4) that have been detected and occurred at the first computer system 101 as listed in the first column of table 500. The table 500 further comprises in the second column definitions or descriptions (Def1-3) for the different changes. Such definitions may be provided, for example, in a format (e.g. a string) interpretable or recognizable by the user 221. The third column of the table 500 comprises the trend of every change which may indicate the pattern of a change over time. The trend can be upward such as for the first and second changes change1 and change2, to indicate for example that KPI values associated with changes change1 and change2 are stables over time e.g. same KPI values obtained in a previous time period. The trend may be different for the third category change, change 3 to indicate that KPI associated with this category of change change 3 may not be sufficiently stable compared to previous results, or downward. The last column of table 500 shows different values of a KPI associated with the different changes change1-3. The KPI values may indicate the percentage of update tasks for the respective changes change1-3 that have been automatically executed.

FIG. 6 is a block diagram of a computing device, according to an example embodiment of the central management module 111. One example-computing device in the form of a computer 610, may include a processing unit 602, memory 604, removable storage 612, and non-removable storage 614. Although the example-computing device is illustrated and described as computer 610, the computing device may be in different forms in different embodiments. For example, the computing device may instead be a smartphone, a tablet, or other computing device including the same or similar elements as illustrated and described with regard to FIG. 6. Further, although the various data storage elements are illustrated as part of the computer 610, the storage may also or alternatively include cloud-based storage accessible via a network, such as the Internet.

Returning to the computer 610, memory 604 may include volatile memory 606 and non-volatile memory 608. Computer 610 may include—or have access to a computing environment that includes a variety of computer-readable media, such as volatile memory 606 and non-volatile memory 608, removable storage 612 and non-removable storage 614. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions. Computer 610 may include or have access to a computing environment that includes input 616, output 618, and a communication connection 620. The input 616 may include one or more of a touchscreen, touchpad, mouse, keyboard, camera, and other input devices. The computer may operate in a networked environment using a communication connection 620 to connect to one or more remote computers, such as database servers, web servers, and other computing device. An example remote computer may include a personal computer (PC), server, router, network PC, a peer device or other common network node, or the like. The communication connection 620 may be a network interface device such as one or both of an Ethernet card and a wireless card or circuit that may be connected to a network. The network may include one or more of a Local Area Network (LAN), a Wide Area Network (WAN), the Internet, and other networks.

Computer-readable instructions stored on a computer-readable medium are executable by the processing unit 602 of the computer 610. A hard drive (magnetic disk or solid state), CD-ROM, and RAM are some examples of articles including a non-transitory computer-readable medium. For example, various computer programs or apps, such as one or more applications and modules implementing one or more of the methods illustrated and described herein or an app or application that executes on a mobile device or is accessible via a web browser, may be stored on a non-transitory computer-readable medium.

It will be readily understood to those skilled in the art that various other changes in the details, material, and arrangements of the parts and method stages which have been described and illustrated in order to explain the nature of the inventive subject matter may be made without departing from the principles and scope of the inventive subject matter as expressed in the subjoined claims.

As will be appreciated by one skilled in the art, aspects of the present invention may be embodied as an apparatus, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer executable code embodied thereon.

Any combination of one or more computer readable medium(s) may be utilized. The computer readable medium may be a computer readable signal medium or a computer readable storage medium. A 'computer-readable storage medium' as used herein encompasses any tangible storage medium which may store instructions which are executable by a processor of a computing device. The computer-readable storage medium may be referred to as a computer-readable non-transitory storage medium. The computer-readable storage medium may also be referred to as a tangible computer readable medium. In some embodiments, a computer-readable storage medium may also be able to store data which is able to be accessed by the processor of the computing device. Examples of computer-readable storage media include, but are not limited to: a floppy disk, a magnetic hard disk drive, a solid state hard disk, flash memory, a USB thumb drive, Random Access Memory (RAM), Read Only Memory (ROM), an optical disk, a magneto-optical disk, and the register file of the processor. Examples of optical disks include Compact Disks (CD) and Digital Versatile Disks (DVD), for example CD-ROM, CD-RW, CD-R, DVD-ROM, DVD-RW, or DVD-R disks. The term computer readable-storage medium also refers to various types of recording media capable of being accessed by the computer device via a network or communication link. For example a data may be retrieved over a modem, over the internet, or over a local area network. Computer executable code embodied on a computer readable medium may be transmitted using any appropriate medium, including but not limited to wireless, wire line, optical fiber cable, RF, etc., or any suitable combination of the foregoing.

A computer readable signal medium may include a propagated data signal with computer executable code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

'Computer memory' or 'memory' is an example of a computer-readable storage medium. Computer memory is any memory which is directly accessible to a processor. 'Computer storage' or 'storage' is a further example of a computer-readable storage medium. Computer storage is any non-volatile computer-readable storage medium. In some embodiments computer storage may also be computer memory or vice versa.

A 'processor' as used herein encompasses an electronic component which is able to execute a program or machine executable instruction or computer executable code. References to the computing device comprising "a processor" should be interpreted as possibly containing more than one processor or processing core. The processor may for instance be a multi-core processor. A processor may also refer to a collection of processors within a single computer system or distributed amongst multiple computer systems. The term computing device should also be interpreted to possibly refer to a collection or network of computing devices each comprising a processor or processors. The computer executable code may be executed by multiple processors that may be within the same computing device or which may even be distributed across multiple computing devices.

Computer executable code may comprise machine executable instructions or a program which causes a processor to perform an aspect of the present invention. Computer executable code for carrying out operations for aspects of the present invention may be written in any combination of one or more programming languages, including an object oriented programming language such as Java, Smalltalk, C++ or the like and conventional procedural programming languages, such as the "C" programming language or similar programming languages and compiled into machine executable instructions. In some instances the computer executable code may be in the form of a high level language or in a pre-compiled form and be used in conjunction with an interpreter which generates the machine executable instructions on the fly.

The computer executable code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block or a portion of the blocks of the flowchart, illustrations, and/or block diagrams, can be implemented by computer program instructions in form of computer executable code when applicable. It is further under stood that, when not mutually exclusive, combinations of blocks in different flowcharts, illustrations, and/or block diagrams may be combined. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

A 'user interface' as used herein is an interface which allows a user or operator to interact with a computer or computer system. A 'user interface' may also be referred to as a 'human interface device.' A user interface may provide information or data to the operator and/or receive information or data from the operator. A user interface may enable input from an operator to be received by the computer and may provide output to the user from the computer. In other words, the user interface may allow an operator to control or manipulate a computer and the interface may allow the computer indicate the effects of the operator's control or manipulation. The display of data or information on a display or a graphical user interface is an example of providing information to an operator. The receiving of data through a keyboard, mouse, trackball, touchpad, pointing stick, graphics tablet, joystick, gamepad, webcam, headset, gear sticks, steering wheel, pedals, wired glove, dance pad, remote control, and accelerometer are all examples of user interface components which enable the receiving of information or data from an operator.

A 'hardware interface' as used herein encompasses an interface which enables the computer system or the processor of a computer system to interact with and/or control an external computing device and/or apparatus. A hardware interface may allow a processor to send control signals or instructions to an external computing device and/or apparatus. A hardware interface may also enable a processor to exchange data with an external computing device and/or apparatus. Examples of a hardware interface include, but are not limited to: a universal serial bus, IEEE 1394 port, parallel port, IEEE 1284 port, serial port, RS-232 port, IEEE-488 port, Bluetooth connection, Wireless local area network connection, TCP/IP connection, Ethernet connection, control voltage interface, MIDI interface, analog input interface, and digital input interface.

The invention claimed is:

1. A computer program product including a computer-usable non-transitory storage medium embodying a computer program, the computer program when executed on a data processing system causing the system to:
provide a central management module that is in communication with a first computer system and a second computer system, wherein the first computer system makes first changes at a first rate to a first application having a first configuration, and the second computer system makes second changes at a second rate to the first application;
provide an input data interface;
provide an auto reaction interface and an execution interface;
determine when the second rate is slower than the first rate;
when the second rate is slower than the first rate:
receive from the first computer system via the input data interface data indicative of the first changes in the first configuration, the first changes resulting in a second application having a second configuration, wherein the second configuration comprises at least one of a second software and second hardware configuration;
process the received data for determining at least one component of the second computer system that are affected by the first change;
determine, using the determined components, at least one update task for implementing the change in the second computer system;
assign, to each of the at least one update task, a respective ranking using a predefined ranking criterion;
send, using the auto reaction interface, the at least one update task via the execution interface to the second computer system;
control the second computer system via at least the execution interface to execute the at least one update task in an order defined by the ranking, thereby migrating the first changes to the second computer system where they can be synchronized with the second changes resulting in a third application having a third configuration; and moving the third application from the second computer system to the first computer system for testing.

2. A central management module for controlling changes in at least a first and a second computer system, the first computer system comprising a first development server that is connected to a production server, wherein the production server comprises a first application having a first configuration, wherein the first configuration comprises at least one of a first software and first hardware configuration, wherein the first development server is configured to perform at least one of providing, and modifying the first application at the first development server by generating first changes to the first configuration, the second computer system comprising a second development server, wherein the second development server is configured to modify the first application at the second development server by generating second changes to the first configuration, the central management module comprising:
- a hardware processing unit and associated memory;
- an input data interface;
- an auto reaction interface; and
- an execution interface;

wherein the central management module is configured for:
- determining when the first changes are generated at higher rate than the second modifications;
- when the first changes are generated at a higher rate than the second changes:
  - receiving, by the hardware processing unit via the input data interface, data indicative of the first changes in the first configuration from the first computer system, the first changes resulting in a second application having a second configuration, wherein the second configuration comprises at least one of a second software and a second hardware configuration;
  - processing, by the hardware processing unit, the received data for determining at least one component of the second computer system that are affected by the first changes;
  - based on the determined components determining at least one update task for implementing the first changes in the second computer system; and
  - assigning, to each of the at least one update task, a respective ranking using a predefined ranking criterion;
  - sending, using the auto reaction interface, the at least one update task via the execution interface to the second computer system; and
  - controlling the second computer system via at least the execution interface to execute the at least one update task in an order defined by the ranking, thereby migrating the first changes to the second computer system where they can be synchronized with the second changes that when implemented result in a third application having a third configuration; and
  - moving the third application from the second computer system to the first computer system for testing.

3. The central management module of claim 2, further configured for:
- controlling the second computer system to upgrade the first application to the third application at the second development server;
- test the third application using a test server of the second computer system, the test server being connected to the second development server; and
- report, using the second development server or the test server, the upgrade to the central management module in case the test is a successful test;
- move the upgraded third application to the production server for performing production using the upgraded third application.

4. The central management module of claim 2, wherein the central management module is configured for ranking the one or more updated tasks by:
- controlling the auto reaction interface to perform the ranking; or
- prompting a user of the central management module via the auto reaction interface to provide the ranking.

5. The central management module of claim 2, further comprising a reporting interface, wherein the central management module is further configured for
- determining for the one or more update tasks at least one key performance indicator, KPI;
- rendering the at least one KPI using the reporting interface.

6. The computer program product of claim 1, wherein the first and second changes to the first application are made independently and in parallel.

7. The central management module of claim 2, wherein the first and second changes to the first configuration are made independently and in parallel.

* * * * *